United States Patent [19]

Voren

[11] Patent Number: 5,511,511

[45] Date of Patent: Apr. 30, 1996

[54] AVIAN FEEDING DEVICES

[76] Inventor: Howard J. Voren, 1538 E Rd., Loxahatchee, Fla. 33470

[21] Appl. No.: 482,908

[22] Filed: Jun. 8, 1995

[51] Int. Cl.$^6$ .................................................. A01K 39/014
[52] U.S. Cl. .................................... 119/464; 119/477
[58] Field of Search ........................................ 119/18, 61

[56] References Cited

U.S. PATENT DOCUMENTS

| | | | |
|---|---|---|---|
| 1,191,184 | 7/1916 | Hooper | 119/61 |
| 3,527,554 | 9/1970 | Peterson | 119/18 |
| 4,215,650 | 8/1980 | Campbell | 119/18 |

Primary Examiner—Robert P. Swiatek
Assistant Examiner—Elizabeth Shaw
Attorney, Agent, or Firm—Carroll F. Palmer

[57] ABSTRACT

An avian feeding device has a bird cage of the wire mesh type and a feeding tray that includes a bifurcated backing member with a mounting space provided between a front sheet portion and a rear web portion. The cage has a rectangular opening formed in a wire mesh, vertical wall by cutting away an adjacent plurality of its vertical wires. The tray mounts to the cage through such opening with downward movement to bring a horizontal wire of such mesh, vertical wall into the mounting space. No handles or like protrusions are needed to assist in removing the tray for service since it may be removed from the cage simply by applying upward pressure to the lower section of the rear web portion of the backing member and withdrawing the tray through the rear mesh wall opening which is of sufficiently small size that birds contained in the cage can not escape even with the feeding tray removed from the cage.

5 Claims, 2 Drawing Sheets

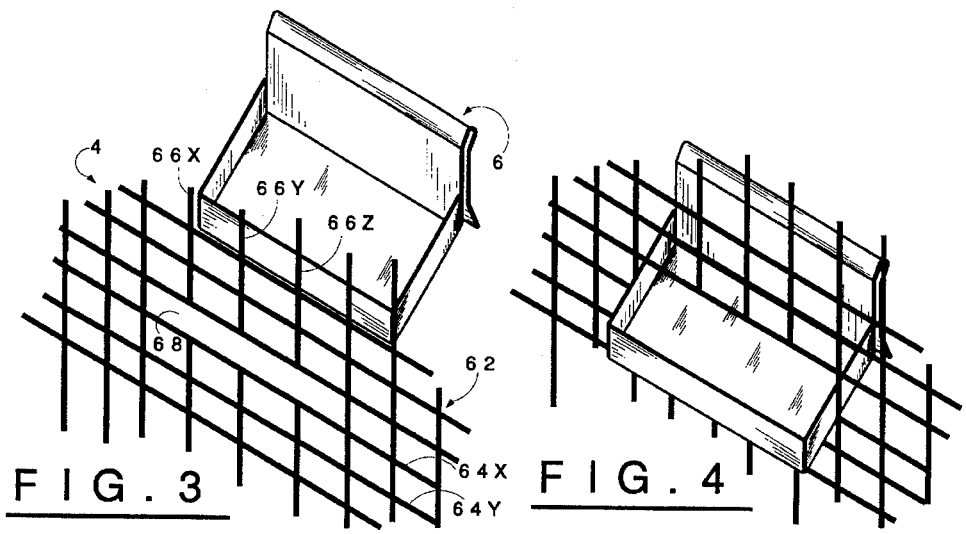
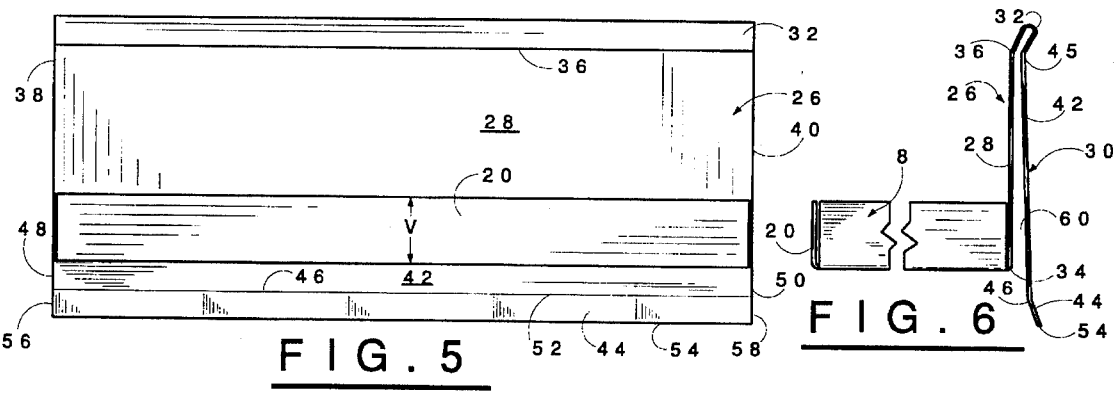
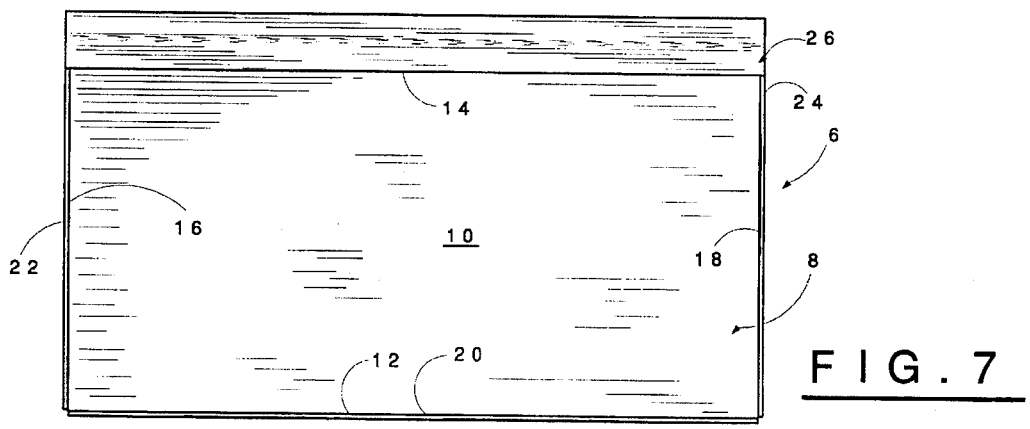

AVIAN FEEDING DEVICES

BACKGROUND OF THE INVENTION

1. Field of the Invention

This application relates to avian feeding devices. More particularly, it concerns feeding trays that can be removed and serviced without need to open or close the doors to exotic bird breeding cages.

2. Description of the Prior Art

Historically, feed trays of cages for birds or other small animals have been of two basic types, namely, either a permanent part of the cage structure or a separate vessel that is serviced by movement into and out of the cage through its door or other access closure. Since both types of such trays typically require opening of the cage door with attendant hand and arm insertions, they create possibility for escape. Further, separate feeding vessels that rest on the cage floor may be easily upset to create a messy cage.

These problems have been addressed by those skilled in the art resulting in the provision of feeding trays that can be serviced without need to open a cage door as shown by U.S. Pat. Nos. 3,554,165 and 5,142,247. The present invention provides further improvements in such types of feeding trays.

OBJECTS

A principal object of the invention is the provision of improved bird cage feeding trays that can be serviced without need to open a cage door.

A further object is the provision of such type trays that require no supports or holders in the cage.

An additional object is the provision of improved servicing feed trays for bird cages that do not require handles or like holders that extend beyond the outside the cage to consume space between cages or present protrusions that can act as snares for cage handlers during servicing or other activity about the cage.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of avian feeding devices comprising in combination a bird cage and a unique feeding tray that can be serviced from outside the cage without need for handles or like extensions protruding from the feeding tray.

The unique avian feeding devices of the invention basically comprise the combination of a bird cage and a feeding tray.

The feeding tray comprises a rectangular vessel having a rectangular flat bottom defined by a front edge, a back edge equal in length to the front edge plus first and second side edges of equal length.

From each of the front and side edges, there upstand rectangular front and side walls all of a same given height plus there is a complex back member upstanding from the back edge of height equal to at least two times the given height.

The complex back member serves both as the back wall for the vessel and the means for mounting the feeding tray to the bird cage. It comprises a flat front sheet, a rear web and an integral U-shaped section. The flat front sheet is rectangular and defined by a bottom edge substantially equal in length to the back edge of the flat bottom, a top edge equal in length to the bottom edge, a third side edge of length at least twice the given value and a fourth side edge equal in length to the third side edge.

The rear web of the complex back member consists of a rectangular flat top sheet and a rectangular flat bottom sheet. Such top sheet is defined by a first upper edge equal in length to the front sheet top edge, a first lower edge equal in length to the first upper edge, a fifth side edge greater in length than the third side edge and a sixth side edge equal in length to the fifth side edge.

The bottom sheet of the rear web is defined by a second upper edge being equal in length to and integral with the first lower edge, a second lower edge equal in length to the second upper edge, a seventh side edge substantially shorter in length than the given length and an eighth side edge equal in length to the seventh side edge.

The U-shaped section integrally joins the top edge of the front sheet to the first upper edge of the top sheet to fix the front sheet spaced apart from the top sheet providing a mounting space therebetween.

The cage is defined by walls at least one of which is a mesh wall formed of a plurality of horizontal wires spaced apart a distance slightly larger than the given length and a plurality of vertical spaced apart wires. In preferred embodiments of the invention, the cage is a breeding cage for exotic birds and usually will have all of its six rectangular sides made of the same wire mesh with an access door in the large front side. Typically, the mesh wire is about 1/16" in diameter, the horizontal wires are spaced about 1" apart and the vertical wires about 2" apart.

A rectangular tray opening is provided in a mesh wall of the cage for mounting the feeding tray of the invention. Such opening has an area slightly larger than the area of the rectangular front wall of the vessel portion of the feeding tray, which vessel is typically about 3/4" high and 9 & 3/4" wide and the opening is 1" high and 10" wide. The opening is formed by cutting away a portion of each of several adjacent of the vertical wires in the rear mesh wall.

The feeding tray is mounted upon the cage so all portions thereof, except the rear web, extend inwardly of the rear mesh wall, with all of the rear web positioned outwardly of the mesh wall and with at least one of the horizontal wires of the mesh wall captured in the mounting space of the complex back member.

The feed tray is removed from the cage by applying upward pressure upon the second lower edge of the bottom sheet of the rear web to move captured horizontal wires out of the mounting space thereby permitting the vessel to be withdrawn through the tray opening.

Advantageously, the feeding tray is made of sheet metal, especially stainless steel, and all recited components of the feeding tray are formed of a single sheet of metal only by sectional cutting and bending of the sheet, i.e., welding of adjacent edges is not necessary.

BRIEF DESCRIPTION OF THE DRAWINGS

A more complete understanding of the invention can be obtained by reference to the accompanying drawings in which:

FIG. 3 is a reduced size isometric view of the feeding tray of FIG. 1 approaching insertion into the cage.

FIG. 4 is an isometric view similar to FIG. 3, but with the feeding tray partially inserted into the cage.

FIG. 5 is a front view of the feeding tray of FIG. 1 fully removed from a cage.

FIG. 6 is a lateral view of the cage shown in FIG. 5.

FIG. 7 is a plan view of the cage shown in FIG. 5.

DESCRIPTION OF THE PREFERRED EMBODIMENTS

Figure 1:
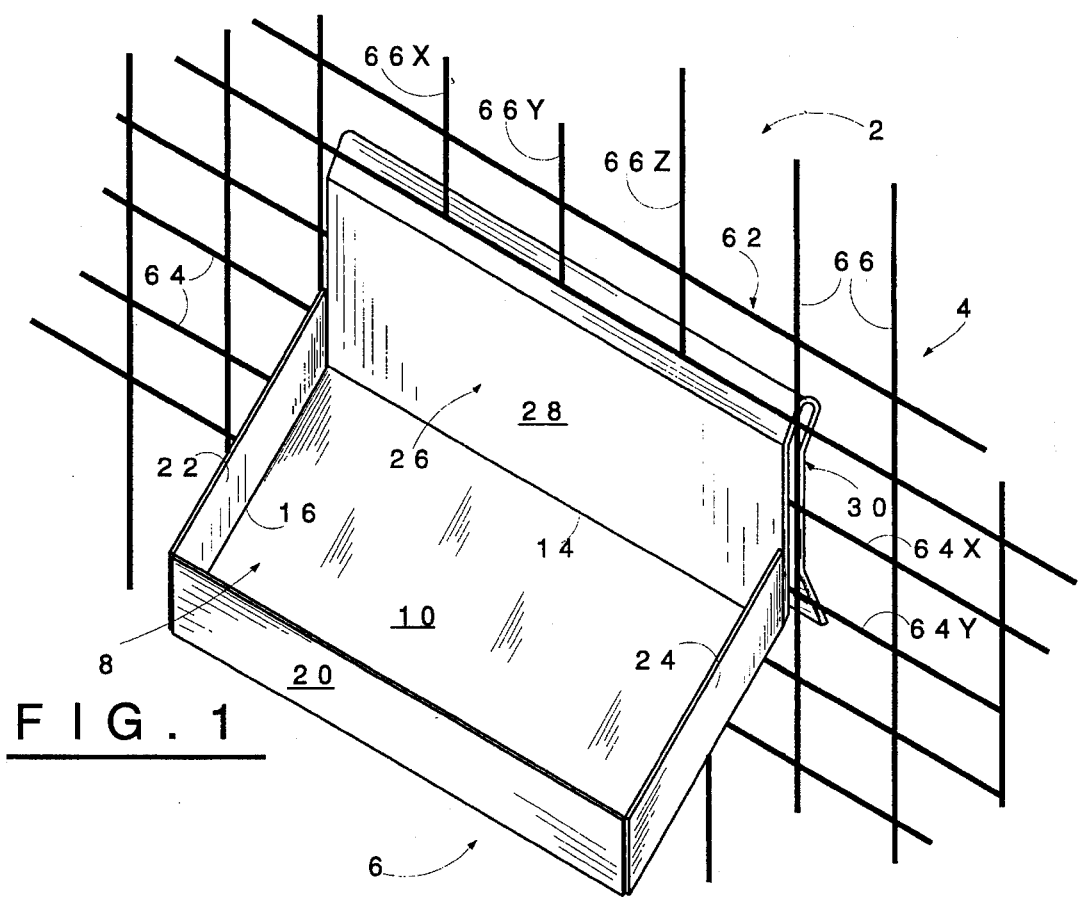
FIG. 1 is a fragmentary view of a bird cage and full isometric view of feeding tray of the invention mounted therein.
Figure 2:
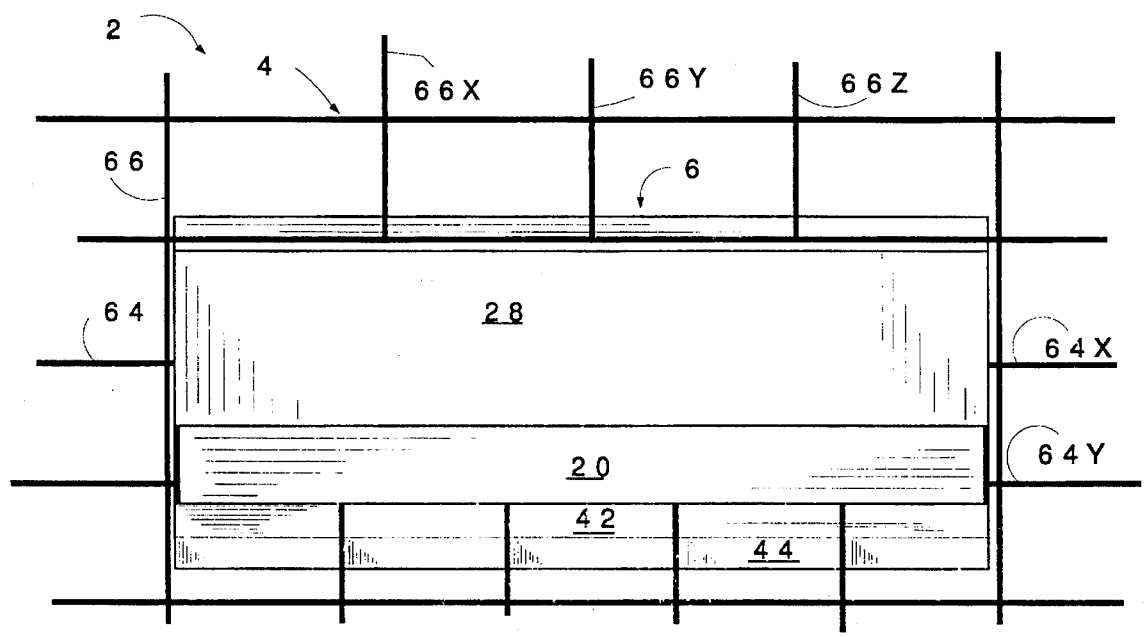
FIG. 2 is a front view of the feeding tray of FIG. 1 as viewed from the inside of the cage.

For a detailed description of the invention, reference is made to the drawings in which generic parts of the illustrated matter are indicated by arrowhead lines associated with the designation numerals and specific parts are indicated with plain lines associated with the numerals.

The avian feeding device 2 of the invention comprises a bird cage 4 and a feeding tray 6.

The feeding tray 6 is a rectangular vessel 8 having a rectangular flat bottom 10, a front edge 12, a back edge 14, a first side edge 16 and a second side edge 18, a front wall 20, a first side wall 22 and a second side wall 24, all three walls having a height of a given value V.

The feeding tray 6 also comprises a complex back member 26, upstanding from the back edge 14, that serves both as the back wall for the vessel and the means for mounting the feeding tray 6 to the bird cage 4.

The back member 26 comprises a flat front sheet 28, a rear web 30 and a U-shaped section 32.

The sheet 28 has a bottom edge 34 substantially equal in length to the back edge 14, a top edge 36 equal in length to the bottom edge 34, a third side edge 38 of length at least twice the given value V and a fourth side edge 40 equal in length to the third side edge 38.

The rear web 30 consists of a rectangular flat top sheet 42 and a rectangular flat bottom sheet 44.

The top sheet 42 has a upper edge 45 equal in length to the front sheet top edge 36, a lower edge 46 equal in length to the upper edge 45, a fifth side edge 48 and a sixth side edge 50.

The bottom sheet 44 has a second upper edge 52 integral with the first lower edge 46, a second lower edge 54, a seventh side edge 56 substantially shorter in length than given value V and an eighth side edge 58.

The U-shaped section 32 integrally joins the top edge 36 of the front sheet 28 to the first upper edge 45 of the top sheet 42 to fix the front sheet 28 spaced apart from the top sheet 42 providing a mounting space 60 therebetween.

The cage 4 is defined in part by mesh wall 62 formed of a plurality of horizontal wires 64 spaced apart a distance slightly greater than given value V and a plurality of vertical spaced apart wires 66.

The cage 4 has a rectangular tray opening 68 in the mesh wall 62 formed by cutting away a portion of each of adjacent vertical wires 66X, 66Y & 66Z (see FIG. 3).

As shown in FIG. 1, the feeding tray 6 is mounted upon the cage 4 by having all portions thereof, except the rear web 30 extending inwardly of the mesh wall 62, with all of the rear web 30 positioned outwardly of the mesh wall 62 and at least horizontal wire 64X of the mesh wall captured in the mounting space 60. Additional horizontal wires 64, e.g., 64Y, may also be captured in mounting space 60 (see FIG. 1).

The feed tray 6 is removed from the cage 4 by applying upward pressure upon the lower edge 54 of bottom sheet 44 of rear web 30 to move all the captured horizontal wires 64, e.g., 64X & 66Y, out of the mounting space 60 thereby permitting the vessel 8 to be withdrawn through the tray opening 68 as seen in FIG. 3.

The embodiments of the invention in which an exclusive property or privilege is claimed are defined as follows:

1. An avian feeding device comprising in combination a bird cage and a feeding tray, said feeding tray comprising a rectangular vessel having
a rectangular flat bottom defined by a front edge, a back edge equal in length to said front edge, a first side edge and a second side edge equal in length to said first side edge,
a rectangular front wall of a given height of a given value and a length substantially equal to said front edge, said front wall upstanding from said front edge,
a rectangular first side wall of said given height and a length substantially equal to said first side edge, said first side wall upstanding from said first side edge,
a rectangular second side wall of said given height and a length substantially equal to said second side edge, said second side wall upstanding from said second side edge, and
a complex back member upstanding from said back edge,
said complex back member being both the back wall for said vessel and the means for mounting said feeding tray to said bird cage, said back member comprising a flat front sheet, a rear web and a U-shaped section,
said flat front sheet being rectangular and defined by a bottom edge substantially equal in length to said back edge, a top edge equal in length to said bottom edge, a third side edge of length at least twice said given value and a fourth side edge equal in length to said third side edge,
said rear web consisting of a rectangular flat top sheet and a rectangular flat bottom sheet,
said top sheet being defined by a first upper edge equal in length to said front sheet top edge, a first lower edge equal in length to said first upper edge, a fifth side edge greater in length than said third side edge and a sixth side edge equal in length to said fifth side edge,
said bottom sheet being defined by a second upper edge being equal in length to and integral with said first lower edge, a second lower edge equal in length to said second upper edge, a seventh side edge shorter in length than said given value and an eighth side edge equal in length to said seventh side edge,
said U-shaped section integrally joining said top edge of said front sheet to said first upper edge of said top sheet to fix said front sheet spaced apart from said top sheet providing a mounting space therebetween,
said cage being defined by walls at least one of which is a mesh wall formed of a plurality of horizontal wires spaced apart a distance slightly greater than said given value and a plurality of vertical spaced apart wires,
a rectangular tray opening in said mesh wall of an area slightly larger than the area of said rectangular front wall formed by cutting away a portion of each of several adjacent of said vertical wires, said feeding tray being mounted upon said cage by all portions thereof except said rear web extending inwardly of said mesh wall, with all of said rear web positioned outwardly of said mesh wall and with at least one of said horizontal wires of said mesh wall captured in said mounting space, said feeding tray being removable from said cage by applying upward pressure upon said second lower edge of said bottom sheet of said rear web to move said one of said captured horizontal wires out of said mounting space thereby permitting said vessel to be withdrawn through said tray opening.

2. The avian feeding device of claim 1 wherein said feeding tray is made of sheet metal.

3. The avian feeding device of claim 2 wherein said sheet metal is stain less steel.

4. The avian feeding device of claim 2 wherein all recited components of said feeding tray are formed from a single sheet of sheet metal only by sectional cutting and bending of said sheet.

5. The avian feeding device of claim 1 wherein all walls of said cage are made of the same wire mesh.

\* \* \* \* \*